(12) United States Patent
Barritz

(10) Patent No.: US 7,386,614 B2
(45) Date of Patent: Jun. 10, 2008

(54) METHOD ALLOWING PERSISTENT LINKS TO WEB-PAGES

(75) Inventor: Robert Barritz, New York, NY (US)

(73) Assignee: Treetop Ventures LLC, Syosset, NY (US)

( * ) Notice: Subject to any disclaimer, the term of this patent is extended or adjusted under 35 U.S.C. 154(b) by 1030 days.

(21) Appl. No.: 09/861,160

(22) Filed: May 18, 2001

(65) Prior Publication Data

US 2001/0044825 A1    Nov. 22, 2001

Related U.S. Application Data

(60) Provisional application No. 60/205,972, filed on May 19, 2000.

(51) Int. Cl.
G06F 15/173 (2006.01)
G06F 9/26 (2006.01)
G06F 17/30 (2006.01)

(52) U.S. Cl. .......................... 709/226; 709/244; 714/4; 714/5; 711/200; 711/202; 711/203; 711/205; 707/200; 707/201; 707/202; 707/203; 707/204; 707/100; 707/101; 707/102

(58) Field of Classification Search ................ 709/219, 709/224, 225, 223; 707/1–4, 100–104, 200–206, 707/104.1; 714/4, 5; 711/200, 202, 203, 711/205
See application file for complete search history.

(56) References Cited

U.S. PATENT DOCUMENTS 6,092,074 A * 7/2000 Rodkin et al. .............. 709/219
6,256,031 B1 * 7/2001 Meijer et al. ............... 715/854
6,301,617 B1 * 10/2001 Carr .......................... 709/219
6,317,777 B1 * 11/2001 Skarbo et al. .............. 709/204
6,357,010 B1 * 3/2002 Viets et al. ................. 709/225
6,408,296 B1 * 6/2002 Acharya et al. ............ 709/218

(Continued)

OTHER PUBLICATIONS

"Introduction to Persistent Uniform Resource Locators", by Keith Shafer, Stuart Weibel, Eric Jul and Jon Fausey, http://web.archive.org/web/19971210064657/purl.oclc.org/OCLC/PURL/INET96.*

(Continued)

Primary Examiner—Ashok Patel
(74) Attorney, Agent, or Firm—Ostrolenk Faber Gerb & Soffen

(57) ABSTRACT

A system that enables creation of URL addresses in which the path information is partially or entirely symbolic. The symbolic path information is maintained even after the physical path information is altered, whereby users do not have to learn or provide constantly changing URL addresses to accommodate changes in the organization and presentation of evolving or changing web sites. To this end, web servers interface with a URL resolution database tool that contains information that enable the conversion of the symbolic path information to physical path information. Alternatively, the conversion from symbolic to physical path information is carried by augmented web browsers which have access to symbolic path information conversion servers located on the Internet at a centrally distributed location, or even locally, so that web servers receive only physical path information.

22 Claims, 2 Drawing Sheets

U.S. PATENT DOCUMENTS

| | | | |
|---|---|---|---|
| 6,442,602 B1* | 8/2002 | Choudhry | 709/218 |
| 6,519,626 B1* | 2/2003 | Soderberg et al. | 709/203 |
| 6,578,078 B1* | 6/2003 | Smith et al. | 709/224 |
| 6,654,741 B1* | 11/2003 | Cohen et al. | 707/6 |
| 6,687,878 B1* | 2/2004 | Eintracht et al. | 715/512 |
| 2005/0273718 A1* | 12/2005 | Naas | 715/745 |

OTHER PUBLICATIONS

"PURL Frequently Asked Questions", by Keith Shafer, Stuart Weibel, Eric Jul and Jon Fausey, Mar. 1996, http://web.archive.org/web/19971210064138/purl.oclc.org/OCLC/PURL/FAQ.*

"URN Syntax", R. Moats RFC 2141, May 1997, pp. 1-8.*

Referential Integrity of Links in Open Hypermedia Systems, Davis, H., Proceedings of the ninth ACM conference on Hypertext and hypermedia, May 1998, pp. 207-216.*

\* cited by examiner

METHOD ALLOWING PERSISTENT LINKS TO WEB-PAGES

RELATED APPLICATION

This Application claims priority and is entitled to the filing date of U.S. Provisional Application Ser. No. 60/205,972 filed May 19, 2000, and entitled "METHOD ALLOWING PERSISTENT LINKS TO WEB-PAGES", the contents of which are incorporated by reference herein.

BACKGROUND OF THE INVENTION

The present invention is generally related to an Internet addressing system and, more particularly, to a system and method that maintains linkage between Internet addresses and the ultimate web page locations of those addresses, even where links in the Internet addresses have been broken, altered or modified.

Much of the flexibility and interconnectedness provided by the Internet and the World Wide Web is due to the extensive links that exist between webpages. Each link is the address of another webpage (or image, or sound file, or cgi-script, or other object, all of which will be referred to herein as webpages), which may reside on a different website (i.e. a different host domain) than the page containing the link, or may be contained within the same website.

The Web contains hundreds of millions of webpages, and billions of links. But as any web surfer knows, many of those links are "broken", pointing to nowhere because the page they once pointed to no longer exists at that address.

Webpages are typically accessed through use of a web browser, though other software programs, such as Internet search utilities, may do so as well, as may a variety of built-in functions of other software products. (As used herein, the term "web browser" is meant to encompass all these means of accessing URLs.) Links may be either "absolute" or "relative". An absolute link consists of a webpage address in the form of a Uniform Resource Locator (URL), which has the format:
http://host.domain/path/filename Where:
"host" is, typically, www
"domain" is (for IBM's website) ibm.com
"path" is the fully qualified path-address of the file denoted by "filename", comprising the target webpage, reflecting the file's location within the hierarchical directory structure of the computer on which the file resides. For example, if on the IBM website there is a sub-directory of the root directory with the name "products", and if the "products" directory contains a further sub-directory called "hardware", and if the "hardware" directory contains a further sub-directory called "servers", and if the "servers" directory contains a further sub-directory called "aix", and if the "aix" directory contained a file called "howtobuy.htm", the path-address of "howtobuy.htm" would be:
/products/hardware/servers/aix/howtobuy.htm and the URL comprising an absolute link would be:
http://www.ibm.com/products/hardware/servers/aix/howtobuy.h tm By default, a URL points to the beginning of a webpage, as does the above example. However, if the creator of the webpage has named any internal sections of the webpage, it then is possible to link to those sections directly. For example, the section dealing with payment terms within the "howtobuy.htm" webpage could be given the name "PT" by using the following HTML tag, positioned at the beginning of the applicable text:
<A NAME="PT">

The following URL could then be used to link to the specific text dealing with payment terms:
http://www.ibm.com/products/hardware/servers/aix/howtobuy.h tm#PT Often, the filename itself may be omitted from a URL. Many web servers adopt a convention that if a filename is absent, a specific filename is assumed, often "index.htm" or "index.html". For example, if the "howtobuy.htm" file were renamed "index.htm", the following URL would link to it, even without supplying the filename explicitly:
http://www.ibm.com/products/hardware/servers/aix Relative links consist of the relative path from the current webpage to the linked-to webpage. For example, if there was a webpage on IBM's website named "hwlist.htm" in the /products/hardware/ directory, it would have a URL of http://www.ibm.com/products/hardware/hwlist.htm. The hwlist.htm webpage might contain a number of links to other pages, including a link to the howtobuy.htm file described above. Instead of using the absolute link described above, a relative link could be used, which would be:
/servers/aix/howtobuy.htm Web browsers form absolute links from relative links by combining the relative link with the path of the current webpage. They do this by concatenating the relative link together with the full path of the current webpage to form the full URL of the linked-to page, which is then used to access the linked-to page. In the example given above, when the relative link (/servers/aix/howtobuy.htm) is concatenated with the path of the hwlist.htm webpage itself (http://www.ibm.com/products/hardware) the result (http://www.ibm.com/products/hardware/servers/aix/howtobuy. htm) is the absolute URL of the linked-to page.

An advantage of using relative links when constructing webpages is that that if a webpage and all its direct or indirect sub-pages are severed from their existing location and moved to another location in the webpage tree, the relative links, which give the path information of the desired target webpage relative to the current location, continue to operate in the desired manner without modification.

A webpage may link to another, target, webpage by embedding within its HTML the address, in the form of the URL, of the target webpage. A particular URL uniquely identifies a particular webpage. For example, www.ibm.com is the URL of IBM's home page. Pages within IBM's website have URL-addresses that reflect their hierarchical location on the computer hosting the website. The page devoted to servers has a URL of www.ibm.com/servers, the page describing a particular server, the AIX computer, has a URL of www.ibm.com/servers/aix, and the page describing how to buy an AIX computer has the URL of www.ibm.com/servers/aix/howtobuy.htm. Someone wishing to, let's say, create a directory-webpage comprising a list of available computer equipment could point into the IBM website, perhaps linking to the AIX product-description at www.ibm.com/servers/aix, and the purchasing information at www.ibm.com/servers/aix/howtobuy.htm. These URLs may be manually transcribed into the HTML of the directory webpage, or they may be quasi-automatically captured while viewing the applicable page with a browser (such as Microsoft Internet Explorer or Netscape Navigator) by saving a bookmark or copying the current-URL line, then pasting this data into the HTML.

But, if IBM subsequently changes the structure of its website, any URLs previously gathered may no longer be valid. For example, if the page on servers became subordinate to a page devoted to "hardware" the server-page might have a new URL of www.ibm.com/hardware/servers and the AIX-page would have a new URL of www.ibm.com/hardware/servers/aix. Or, the IBM website might be changed from a static structure, with each page predefined, to a dynamic structure where certain pages are generated on-the-fly by a program operating on the server. For example, the URL www.ibm.com/aw-cgi/ibmISAPI.dll?ViewItem&item=259 might invoke a cgi-script named ibmISAPI, which would expect to receive an item-code corresponding to the product in question, in this example 259, corresponding to AIX. The cgi-script would use the item-code to access a database, retrieve information about the product, and build the webpage to be displayed. Or, IBM could consolidate all the information from a variety of servers, including AIX, on a single page with the URL www.ibm.com/hardware/allservers, in which case the AIX information would be embedded somewhere within this composite page.

If the prior AIX-related URLs (www.ibm.com/servers and www.ibm.com/servers/aix) had been used in any other pages as links, they would no longer work, even though the information—the content—of the pages they originally linked to still exists, though not at the same location as previously. (Note that this is fundamentally unlike certain other situations causing broken links in which the content is simply gone, such as a deleted website, an out-dated news article, or a discontinued product.) The Webmaster of the directory-webpage would not be alerted to the fact that IBM had changed the structure of their website, causing some of the links in the directory-webpage to become broken, and could only determine this fact by constant checking. In fact, there are products like Xenu's Link Sleuth or services like LinkAlarm that are specifically directed at finding and reporting on broken links by constantly or periodically monitoring the website containing them. Some websites even ask visitors to fill out a form, reporting on any broken links they may have encountered.

But however a broken link may be discovered, it usually must be fixed manually. To fix the links broken by IBM's hypothetical reorganization of its website, the webmaster of the directory-website would typically have to visit the IBM website, find the new locations of the pages that the links used to point to, copy their present URLs, and recreate the links.

A similar situation exists for those individuals who create bookmarks or favorites, which are essentially identical to links, and can be broken in the same way.

And broken links can also occur within the restructured website itself, not just externally. It's very common for the pages of a website to cross-link to one another, to allow the user to navigate to anywhere, from anywhere, and some of these links can break whenever any restructuring takes place. And relative links, which are extensively used to link within a website, though insensitive to changes to the path that occur "above" the page containing the relative link, are readily broken by any changes in the path "below" the containing page.

The author or Webmaster of the IBM website could attempt to avoid the problem of broken links by providing "redirect" instructions to the web server serving the IBM website domain. These "redirect" instructions specify both the old URL (the one that no longer exists) and the new URL that accesses to the old URL should be directed to instead. For example, accesses to the first version of the AIX page www.ibm.com/servers/aix, in this example now defunct, could be redirected to the second version at www.ibm.com/hardware/servers/aix. The web server typically effects the redirection by returning the new URL to the browser, along with an appropriate indicator; the browser then simply reprocesses the URL in the usual manner, thereby accessing the new webpage. As an alternative, a web server may itself access the new webpage and return it to the browser in response to the original request (the "old" URL), however in this instance the web server must still supply back to the browser the new URL. (Note that this is required because web browsers, as described previously, process relative links by concatenating them with the absolute URL of the page containing the relative link. Therefore, if redirection occurs, in order to be able to process relative links if any are encountered, the web browser must be informed by the web server as to the actual URL of the page that the original request was redirected to, and which was returned to the web browser for display. In the present example, though the browser may have requested www.ibm.com/servers/aix, the page actually returned to the browser has the URL www.ibm.com/hardware/servers/aix, and the browser would receive this updated URL from the server.) But, if the IBM website is restructured again, the redirection instruction might have to be changed so that accesses to the first AIX page, www.ibm.com/servers/aix, are now redirected to the third version at www.ibm.com/aw-cgi/ibmISAPI.dll?ViewItem&item=259. Moreover, since there will also continue to be accesses to the second version, another redirection instruction would have to be created so that accesses to the second version, www.ibm.com/hardware/servers/aix, are also redirected to the third version, www.ibm.com/aw-cgi/ibmISAPI.dll?ViewItem&item=259. This procedure illustrates the deficiencies of the redirection technique, which requires that each earlier version of a webpage be redirected to the current version of that webpage, and that each of these redirection instructions remain in place indefinitely, all of which is cumbersome, burdensome, and error-prone.

In addition to being used as links, URL addresses are often simply typed into the browser by the computer user. But URLs are often difficult if not impossible to remember (in one of the prior examples, the user would have to remember that www.ibm.com/aw-cgi/ibmISAPI.dll?ViewItem&item=259 is the URL for the AIX page), laborious to type, and subject to being broken or outdated in the same way as URLs used as links.

In response to these deficiencies, several firms, including Netword Inc. and RealNames Corporation, have devised systems in which users can type easy-to-remember keywords into their browsers in place of URLs. (Netword Inc. is the holder of U.S. Pat. No. 5,764,906: "Universal electronic resource denotation, request and delivery system".) For example, if "AIX" had been established as such a keyword, a user could simply type "AIX" into his browser and be taken to the current appropriate webpage, such as www.ibm.com/aw-gi/ibmISAPI.dll?ViewItem&item=259. This is accomplished through use of a central database maintained by the proprietors (such as Netword or RealNames) of the keyword system that correlates each keyword with the applicable URL. When a user types something that looks like a keyword into a browser, the browser uses it to access the keyword database. If it's a defined keyword, the database returns the corresponding URL to the browser, which then processes that URL as if the user had typed it in. The responsibility typically rests with the webmasters of each participating website to use the facilities of the keyword system to assign the keywords, associate the appropriate URL, and update the database whenever restructuring of their website causes changes to any of the URLs associated with keywords.

A problem with keyword systems is that there is no single central keyword database: both Netword and RealNames maintain their own databases. Particular keywords might be defined in one system but not the other, or might be defined in both, but conflict with one-another. For example, the IBM webmaster might register "AIX" as a Netword keyword, and associate it with a page on the IBM website, but some other webmaster, perhaps associated with a company selling AIX-related software, or the Allied Insurance Exchange, may have previously registered "AIX" with RealNames. In this example, for a user who types in a keyword of "AIX", the webpage that the user is eventually taken to will depend on which database the keyword is looked up in. Keywords, being short, provide a limited name-space that will inevitably lead to conflicts and collisions. For example, consider that "Explorer" is the name of a browser (from Microsoft), a sport-utility vehicle (from Ford) and the name of a Boy Scout program. Each of these organizations might wish to use "Explorer" as a keyword tied to a URL within their website. Further contributing to erratic results is the fact that different browsers give precedence to different keyword systems. For example, Microsoft Internet Explorer looks keywords up in the RealNames database, but does not consult Netword. Netscape Navigator does not use RealNames (perhaps because RealNames is partially owned by Microsoft), but can readily be customized to consult Netword. And AOL has its own system of keywords, unrelated to RealNames or Netword, that only functions for users of the AOL online service. Moreover, creating keywords can be expensive. RealNames charges an annual fee of $100 per keyword (which is greater than the annual fee to keep a domain name active) and many organizations might wish to maintain dozens or even hundreds of keywords.

Another deficiency associated with the use of keywords is that since the browser immediately translates each keyword to its associated URL and then uses that URL for further processing, if the person using the browser bookmarks (or copies, either manually or programmatically) that URL, or the URL of any subsequent webpage that the initial page might directly or indirectly link to, whether absolutely or relatively, that bookmarked or copied URL is fully vulnerable to being broken in the future, just as if a keyword had never been initially employed.

In summary, URLs are hard to remember and, when used as links, are fragile and easily broken. The process of discovering and repairing broken links is unsystematic and extremely laborious. Keyword aliases for URLs are expensive, unreliable and inconsistent, discouraging website owners from creating and publicizing them. The present invention describes several methods, which would greatly minimize the incidence of broken links, while also providing easily remembered or inferred URLs that would behave in a reliable, predictable fashion.

SUMMARY OF THE INVENTION

Accordingly, it is an object of the invention to provide a system and method that allows creation of URL addresses in which the path information is partially or entirely symbolic.

It is another object of the invention to provide a system and method for Internet addressing that is more adaptable to addressing changes.

Still another object of the invention is to provide a system and method for Internet addressing which is more versatile and tolerant to revisions or modifications.

The foregoing and other objects of the invention are realized by the system and method of the present invention which is to be known as the Symbolic Addressing System (SAS) and which creates URL addresses in which the path information is partially or entirely symbolic. In accordance with several embodiments of the invention, a web site can receive and process URL addresses which are constituted partially or wholly by path information that is symbolic. A URL Resolution Database (URD) helps convert the symbolic path information to conventional physical path information that allows the web server at the web page to properly direct web information requests and to provide web content even where web page reorganizations have altered the physical location of web pages. (As used herein, the term "physical" means the structure of folders and subfolders, typically residing on a hard disk, which are used to contain the files, images, and other elements of a website.)

Preferably, the URD operates in conjunction with Correlation Records (CRs), and with a URL Correlation Tool and a SPI Correlation Tool that operate with the symbolic path information.

Alternatively, the invention operates with Augmented Web Browsers (AWBs) that consult an SPI Conversion Server (SCS) that is Internet accessible and which serves to obtain physical path information, prior to the transmission of the physical path information to the conventional web servers.

Other features and advantages of the present invention will become apparent from the following description of the invention which refers to the accompanying drawings.

DETAILED DESCRIPTION OF THE INVENTION

Figure 1:
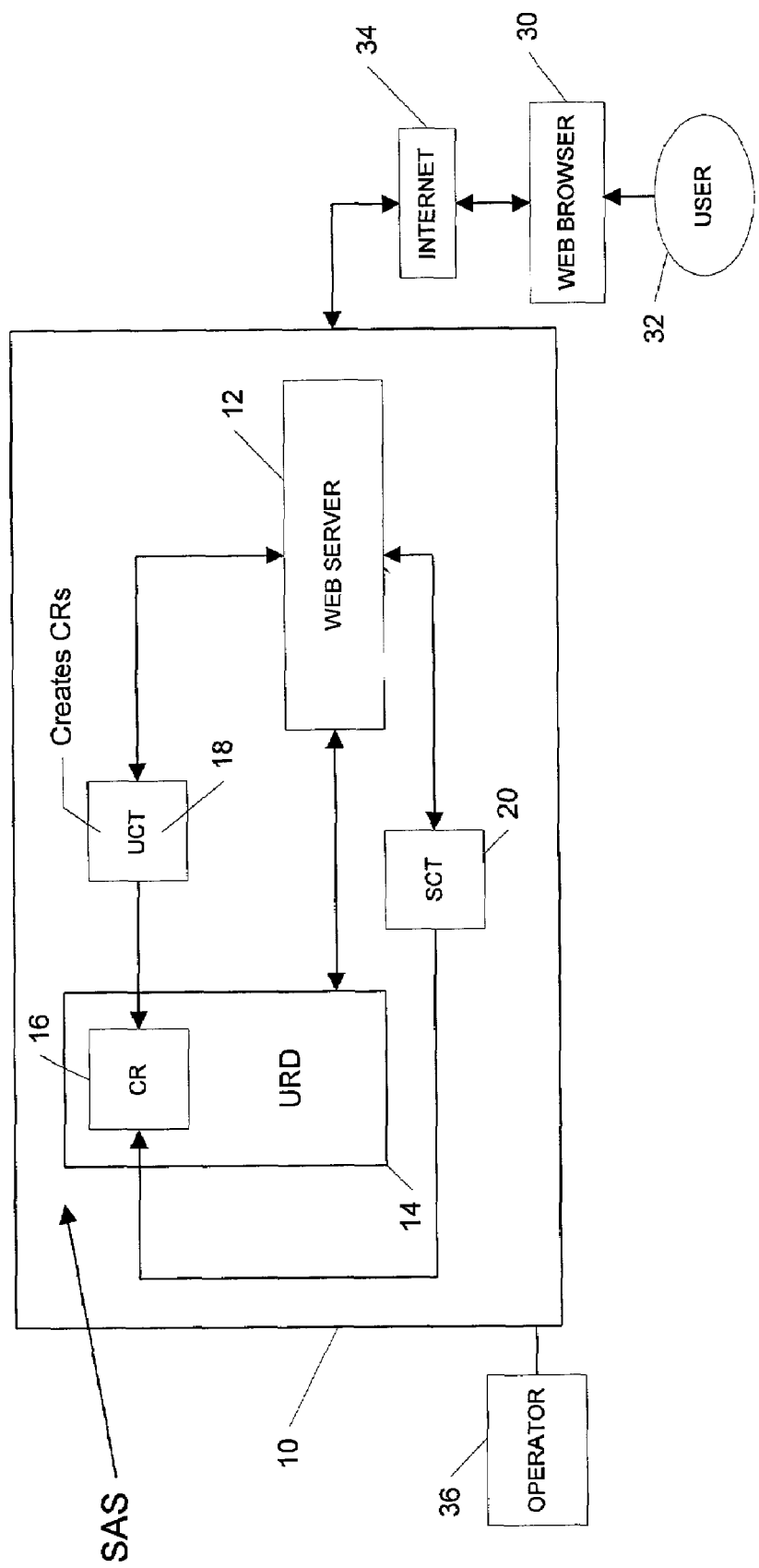
FIG. 1 is a block diagram and layout of the first embodiment of the invention.

It is the object of the invention, which is to be known as the Symbolic Addressing System (SAS), to provide a system to create URL addresses in which the path information is partially or entirely symbolic. Unlike the physical path information (PPI) in URLs or in absolute or relative links, which is tied to the physical structure of a website, and becomes inaccurate whenever that structure changes, symbolic path information (SPI) is largely or completely independent of the physical structure. SPIs are composed, in part, of assigned, arbitrary names that refer to particular content or subject matter, and which are associated to the appropriate, applicable PPI at the time the URL or link containing the SPI is accessed. URLs or links employing SPIs thus remain valid and unbroken so long as the same or equivalent content continues to exist somewhere within the website, and the association between SPI and PPI has been updated and kept current, which may be done by the webmaster, or through other means.

As stated above, URLs have the format:
http://host.domain/PPI-path/filename
A PPI-path contains one or more directories, and can therefore be considered to consist of one or more physical path segments (PPSs), each of which also consists of one or more directories, as follows:

http://host.domain/"path-segment" "path-segment" . . . . "path-segment"/filename For example the PPI /products/hardware/servers/aix may be divided into PPSs in a number of ways, including:
/products/hardware/servers/aix
/products & /hardware/servers/aix
/products/hardware & /servers/aix
/products & /hardware/servers & /aix etc.

SAS allows one or more PPSs to be replaced by SPIs, with each SPI correlated to the applicable PPS through use of a database. For example, the URL www.ibm.com/products/hardware/servers/aix could be expressed, using an SPI arbitrarily named "aixinfo", as www.ibm.com/aixinfo (the PPS corresponding to the "aixinfo" SPI is /products/hardware/servers/aix)

As another example, the URL www.ibm.com/products/hardware/servers/aix/aixpage.htm could be expressed, using an SPI of "aixstuff", as www.ibm.com/aixstuff (the PPS corresponding to the "aixstuff" SPI is /products/hardware/servers/aix/aixpage.htm)

Or the same URL could be expressed, again using an SPI of "aixstuff", as www.ibm.com/aixstuff/aixpage.htm (the PPS corresponding to the "aixstuff" SPI is /products/hardware/servers/aix/)

Or multiple SPIs may be used together. For example, the same URL as used in the above two examples could be expressed, using two SPIs, as www.ibm.com/hardinfo/aixstuff (the PPS corresponding to the "hardinfo" SPI is /products/hardware and the PPS corresponding to the "aixstuff" SPI is /servers/aix/aixpage.htm).

One aspect of the SAS consists of a URL Resolution Database (URD). The URD contains Correlation Records (CRs) each of which correlates an SPI to a PPS. Each CR is assigned an access-key composed of the SPI and the host and domain name. Inclusion of the host and domain name allows a single URD to serve multiple domains without risk that SPIs applicable to one domain will conflict with those from another. The host and domain may be omitted from the key if the URD will only contain information applicable to a single domain.

The URL that is known to the web browser (and displayed to the user, and used for bookmarks, etc.) will be referred to as the "apparent" URL, or AU. The URL that is ultimately used by the web server to access the associated data will be referred to as the "effective" URL, or EU. The AU and the EU may often be identical. However, as will be seen, SAS allows the EU to be arrived at by decoding or transforming a AU that contains SPI data. Note that an EU is not merely some internal representation of a URL, or some set of parameters. An EU is a properly formed URL that could be used, unmodified, as an AU.

Another aspect of SAS consists of an Augmented Web Server (AWS). When processing URLs sent to it by a web browser, the AWS assumes that any directory name or filename that cannot be matched (which would ordinarily result in a "not found" condition) might be an SPI, and therefore uses it to access the URD database (see below). Actual SPIs will be matched in the URD. If no match is obtained, the normal "not found" processing is followed.

Though the above method of SPI detection is preferred, an alternative method is for the AWS to assume that every directory name or filename might be a SPI, and to use the name to try to access the URD before determining if the name is in fact a directory name or filename.

Another alternative method is to use an explicit tag to indicate the presence of a SPI, for example by preceding each SPI with a unique identifier-character (or string) such as ">" or ">#".

Whichever technique may be used to recognize the SPI, the AWS employs the URD to correlate the SPI- to a PPS. If the URD contains a CR matching the supplied key, it returns the corresponding PPS to the AWS. The AWS then modifies the URL by replacing the SPI with the PPS. If there are additional SPIs in the current URL, the AWS follows the described procedure for each of them.

When all SPIs have been processed, the resultant, possibly modified, URL constitutes the EU, which the AWS processes in the usual manner and serves back the appropriate data to the web browser that transmitted the original URL. Note that if the AWS passes back to the originating browser any updated URL information (for example, as a result of redirection, or the inclusion of a default filename) the AWS does not pass back the new, modified URL containing PPSs, but instead passes back the symbolic URL, with SPIs intact, augmented, if appropriate, by including a defaulted filename. The web browser therefore will continue to use as the AU the symbolic URL (including the one or more SPIs), which will therefore be used when creating bookmarks, and as the base-URL when processing relative links. The web browser will also display the AU to the user, so that if the user copies the AU, whether using the computer or manually, any subsequent use will employ the symbolic URL. This ensures that all external URL references continue to be symbolic, with all translation to physical URLs occurring solely within the AWS.

Another aspect of the invention consists of the URL Correlation Tool (UCT). The UCT allows a Webmaster or other authorized user to create CRs within the URD correlating SPIs with their associated PPSs. The user may manually supply the SPI. The PPS may also be manually supplied, or, optionally, the UCT browses the indicated website and, while displaying a particular page, at the direction of the user, use all or a portion of the PPI from the page's URL as the PPS.

Other UCT functions allow existing CRs to be modified (for example to change the PPS associated with a particular symbolic name to a new PPS), and to delete CRs.

Another aspect of the invention consists of the SPI Correlation Tool (SCT). One of the functions of the SCT allows a Webmaster or other authorized user to incorporate into the HTML of a webpage an SPI-tag that contains the SPI associated with that webpage. A number of different conventions may be adopted for the format and placement of the SPI-tag, so long as the SPI-tag, while being intelligible to the SCT, will be ignored by web browsers. Anything contained between "<!" and ">" will be treated by a browser as a comment so, as an example, the SPI-tag might take the form of an HTLM-comment of a particular defined format, such as <! #+SPI=aixinfo>. (Or, as an alternative, the specification of the HTML language might be expanded to formally define the SPI-tag as a recognized construct.) Once inserted into the HTML by the SCT, the SPI-tag persists until intentionally removed, even if the webpage containing it were to be renamed and/or moved to a different location in the website's directory structure.

Following use of the SCT to create SPI-tags, another function of the SCT performs automatic regeneration of CRs. The SCT does this by inspecting all the pages of the website and detecting all the embedded SPI-tags. For each such tag, the SCT creates a CR correlating the indicated SPI with a PPS consisting of the entire PPI of the webpage.

For example, if the SCT was used to insert into the webpage named "aixpage.htm" a SPI-tag of <! #+SPI =aixinfo>, and if the PPI of the webpage is:

/products/hardware/servers/aix/aixpage.htm the SCT, after scanning the aixpage.htm page-file and discovering the embedded SPI-tag, creates a CR correlating "aixinfo" (the SPI) with /products/hardware/servers/aix/aixpage.htm (the PPI, used as the PPS).

As a further enhancement to this process, if one or more specific sections of the webpage have been named, by use of a "NAME=" tag, as described earlier, the SCT optimally also provides the ability to associate SPI-tags with those names. The SCT accomplishes this by using a convention based on the placement within the webpage of the SPI-tag such that SPI-tags will be associated with the previous named section or, if there is no previous named section, with the beginning of the webpage. Alternatively, or in addition, a special location-independent SPI-tag may be used that specifies the name of the section with which it should be associated. For example the tag <! #+SPI#PT=aixinfo> would associate the "aixinfo" SPI with the section of the current webpage named "PT".

As an alternative to the AWS, the process of recognizing SPIs and converting them to PPSs may be performed by an Augmented Web Browser (AWB) rather than by the web server. The AWB (which does not have direct access to the file system of the website being accessed by a URL, and therefore cannot verify whether a seeming directory does or does not exist) assumes that any directory name contained within a URL might be a SPI, and uses that name (combined with the domain-name of the associated website) to try the hypothesis by using the presumed SPI to access the URD. Note that since most directory names would not be SPIs, this would result in a great deal of unproductive overhead, so in an embodiment using an AWB it is preferable for SPIs to be explicitly tagged, as described previously.

The URD may exist on a separate computer from the AWB, accessible via the Internet, or on the same computer. There may be a single URD, performing all SPI-resolution services for the entire Internet, or there may be multiple URDs, each containing the SPI data applicable to a distinct (or overlapping) set of domains. When processing a URL, the AWB may determine which URD to use by consulting a master server (similar to a domain-name server) that correlates domains with the applicable URD-server. The AWB converts symbolic URLs containing SPIs to physical URLs in the same manner as was described for the AWS, and retains the symbolic URL as the AU, thereby ensuring, as described above, that any bookmarks and other copies of the initial URL, or of any URLs subsequently constructed via relative links from the initial URL, record the symbolic form of that URL.

As another alternative, the AWB either sends all URLs, or only those determined to contain one or more SPIs, to another server for processing. This server, the SPI Conversion Server (SCS) performs the remainder of the processing previously described as being performed by the AWB.

Note that the information in the URD may be stored therein using a variety of expediences. These include manual entry of information, automatic gathering of information specifying relationships between symbolic path information and physical path information by automatic scanners that scan web pages and cull from it the relationships, or by communications initiated by the web servers which send to the URD which may exist on the Internet or at other locations, the correlations that pertain to them.

The various facilities, systems, subsystems, process steps, etc. described above are further elucidated by reference to FIGS. 1 and 2, in which FIG. 1 illustrates a typical web page processing that uses the Symbolic Addressing System (SAS) 10 of the present invention, depicting a web browser 30 that receives requests to access URLs from an Internet user 32, such requests being communicated via the Internet 34.

The SAS 10 incorporates the web server 12 which communicates with the URD 14 and which, in turn, accesses or contains within the Correlation Records (CRs) 16. As already described, the URL Correlation Tool (UCT) 18 is interfaced so as to be able to create various Correlation Records 16. The functions of the SPI Correlation Tool (SCT) 20 is to insert SPI tags into the Correlation Records 16 and/or to automatically regenerate various Correlation Records as already described. The overall SAS 10 is under the control of a web site operator 36.

Figure 2:
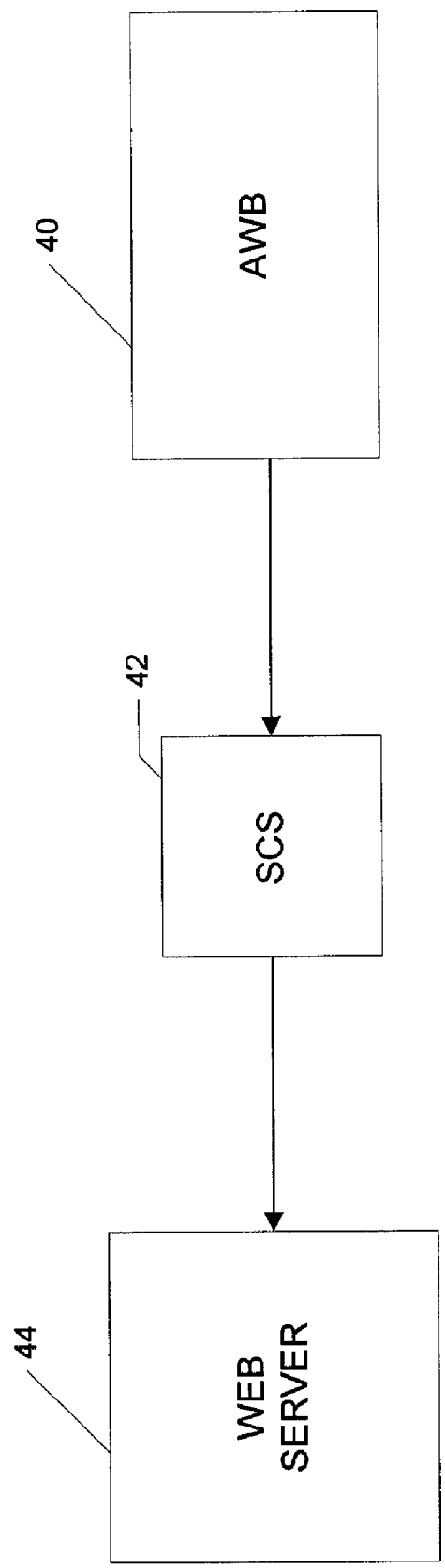
FIG. 2 is a block diagram of a second embodiment of the invention.

With reference to FIG. 2, instead of providing the URL translation functionality at the web server 12, an Augmented Web Browser (AWB) 40 receives URL addresses containing symbolic path information and consults the SPI Conversion Server (SCS) 42 (which can be located on the Internet or locally) to carry out the appropriate conversions that are then communicated via the Internet to a web servers. Accordingly, in the present invention, the web browser user interface operates so that users continue to see the same apparent URLs that they are familiar with or which they have bookmarked or the like, regardless of changes, modifications, alterations, etc. in the effective URLs.

As described above, the present invention has no need to resort to or consult proprietary "key word" translating systems, as in the prior art. Rather, the web site itself provides the functionality that allows the use of symbolic path information simplifying web page addressing and providing the other benefits described above. Alternatively, the requesting web browser is augmented to provide the necessary translation, either directly or through the SPI Conversion Server, in a manner which consistently converts symbolic path information into physical path information.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An Internet-based web addressing system, the system comprising:

a first web site located at a first symbolic uniform resource locator ("URL") address, wherein the first symbolic URL address includes a first domain name;

a second web site located at a second symbolic URL address, wherein the second symbolic URL address includes a second domain name that is different than the first domain name;

a plurality of respective web servers respectively associated with the first and second web sites, that communicate on the Internet and respectively provide access to the first and second web sites in response to the receipt of access requests formatted as symbolic URLs;

a respective web server tool for each of the web servers;

a URL resolution database accessible to the web servers;

a plurality of correlation records in the URL resolution database;

a URL correlation tool operable with the correlation records; and a symbolic path information correlation tool for correlating symbolic path information tag data in the correlation records;

wherein the web server tool is operable with the URL resolution database to convert each received access request formatted with a symbolic URL including a domain and a path name that is not physically present on a respective web server to a non-symbolic URL address that is physically present on the respective web server.

2. The system of claim 1, in which the URL resolution database is located on the Internet and is accessible to a plurality of the web servers.

3. The system of claim 1, wherein the URL resolution database is located locally relative to different ones of said web servers.

4. The system of claim 1, further including a respective web browser interface in each web server for communicating with the web browsers.

5. The system of claim 1, in which the first path name is a subcomponent of the symbolic URL addresses and wherein the symbolic URL addresses are configured to contain a plurality of symbolic path information fields, each field representing a different physical path segment.

6. The system of claim 5, in which each correlation record correlates a symbolic path information field to a corresponding physical path segment.

7. The system of claim 1, in which each correlation record includes an access key comprising a symbolic path information field, a host field, and a domain name field.

8. The system of claim 1, in which the symbolic path information is delimited by special characters to enable identifying it as the special path information.

9. The system of claim 1, including a facility that returns to the web browsers the symbolic URL address information.

10. The system of claim 1, in which the URL correlation tool creates additional correlation records.

11. The system of claim 1, including a facility that enables manual creation of correlation records.

12. The system of claim 1, in which the symbolic path information correlation tool stores within individual web pages symbolic path information tag information.

13. The system of claim 1, in which the symbolic oath information correlation tool includes a facility that automatically regenerates correlation records.

14. The system of claim 1, further including a plurality of web browsers which are in communication with the plurality of web servers, the web browsers outputting apparent URLs which optionally include the symbolic URL addresses and the web server tools converting the apparent URLs to effective URLs.

15. The system of claim 14, in which the web servers do not return to the web servers the effective URLS.

16. An Internet-based web addressing system, the system comprising:
a first web site located at a first apparent uniform resource locator ("URL") address and having a first domain name, and a corresponding web content associated with the first web site;
a second web site located at a second apparent URL address and having a second domain name that is different than the first domain name, and a corresponding web content associated with the second site;
web servers respectively associated with the first and second web sites which respond to requests for URL addresses to grant access to the corresponding web content associated with the first and second web sites;
a respective web server tool for each of the web servers;
a plurality of web browsers that are operable to receive apparent URL addresses from users; and
a symbolic path information conversion tool that converts the symbolic path information of the apparent URL address to physical path information and transmits the apparent URL addresses which lack symbolic path information over the Internet to the web servers;
wherein the web server tool is operable with an apparent a URL resolution database storing a plurality of correlation records in the apparent URL resolution database and accessible to the web browsers and containing a facility URL correlation tool operable with the correlation records which, upon receiving an apparent URL having a domain and at least one first path name which is not on a respective web server, persistently converts the apparent URL to an effective URL that includes a second pathname that is physically present on a respective web server.

17. The system of claim 16, in which the first path name is delimited by special characters.

18. The system of claim 16, wherein the browsers continue to use the apparent URLs for purposes other than the conversion of the apparent URLs to effective URLs.

19. The system of claim 18, in which the other purposes include bookmarking.

20. The system of claim 18, in which the other purposes include for displaying URLs to users.

21. The system of claim 18, in which the other purposes include processing of relative URLs.

22. The system of claim 18, in which the other purposes include reporting URLs to other facilities.

* * * * *